Oct. 22, 1968

J. A. CARR 3,407,179

BATCH POLYMERIZATION OF AQUEOUS
DIAMINE-DICARBOXYLIC ACID SALT

Filed May 12, 1965

United States Patent Office 3,407,179
Patented Oct. 22, 1968

3,407,179
BATCH POLYMERIZATION OF AQUEOUS DIAMINE-DICARBOXYLIC ACID SALT
James Arthur Carr, Richmond, Va., assignor to E. I. du Pont de Nemours and Company, Wilmington, Del., a corporation of Delaware
Continuation-in-part of application Ser. No. 127,937, July 31, 1961. This application May 12, 1965, Ser. No. 455,190
3 Claims. (Cl. 260—78)

This application is a continuation-in-part of my copending application Ser. No. 127,937, filed July 31, 1961, now abandoned. The invention relates generally to synthetic linear condensation polymers and more particularly to improvements in the process and apparatus employed in the polymerization of gel-susceptible polymer-forming materials.

According to known procedures, nylon is polymerized by charging an aqueous salt solution to a batch autoclave, heating the salt, removing excess water by bleeding off steam, continuing with the application of heat until the polymerization has reached a desired stage and then discharging molten nylon from the autoclave for further processing steps. It is equally well known that splashed or condensed material usually adheres to the walls above the melt pool as well as on the various pipes and wells projecting into the autoclave. As each batch is discharged from the autoclave, a film of this material remains on the inner walls, stagnates and eventually forms gel. At first, this gel has no appreciable effect on succeeding batches. In due time, however, the resulting nylon is degraded, yarn spun therefrom is not marketable, and it becomes necessary to inactivate the autoclave for maintenance and overhaul.

Zimmerman has proposed (U.S. Patent No. 2,951,777) the use of liquid carboxylic acid at a temperature above the polyamide melting point for removing gelled polymers. Although effective, this procedure requires a separate autoclave flushing operation between batches. Hull has proposed (U.S. Patent No. 2,729,538) that the metal surfaces of elements which come in contact with molten polymer should be coated with silicone. This is beneficial on melting grids, spinning units, etc., but has not been effective in a batch autoclave.

The most important object of the present invention is to provide process and apparatus improvements by means of which gel formation during the polymerization of polymer-forming materials is inhibited. A corollary objective is to eliminate the need for a separate flushing step between succeeding autoclave batches and, at the same time, to provide for the effective and efficient removal of any gel-susceptible polymeric residue from the internal surfaces of an autoclave.

In the preparation of a polycarboxamide, the above objectives are accomplished in a simple and economical fashion by spraying the charge of aqueous carbonamide forming reactants from which each succeeding polymer batch is prepared against the exposed surfaces in an autoclave, thereby flushing any residue of the preceding batch to the accumulating pool of reactants.

Other advantages will become apparent in the following specification and in the example wherein reference is made by the use of designating numerals to the accompanying drawing in which.

Figure 1:
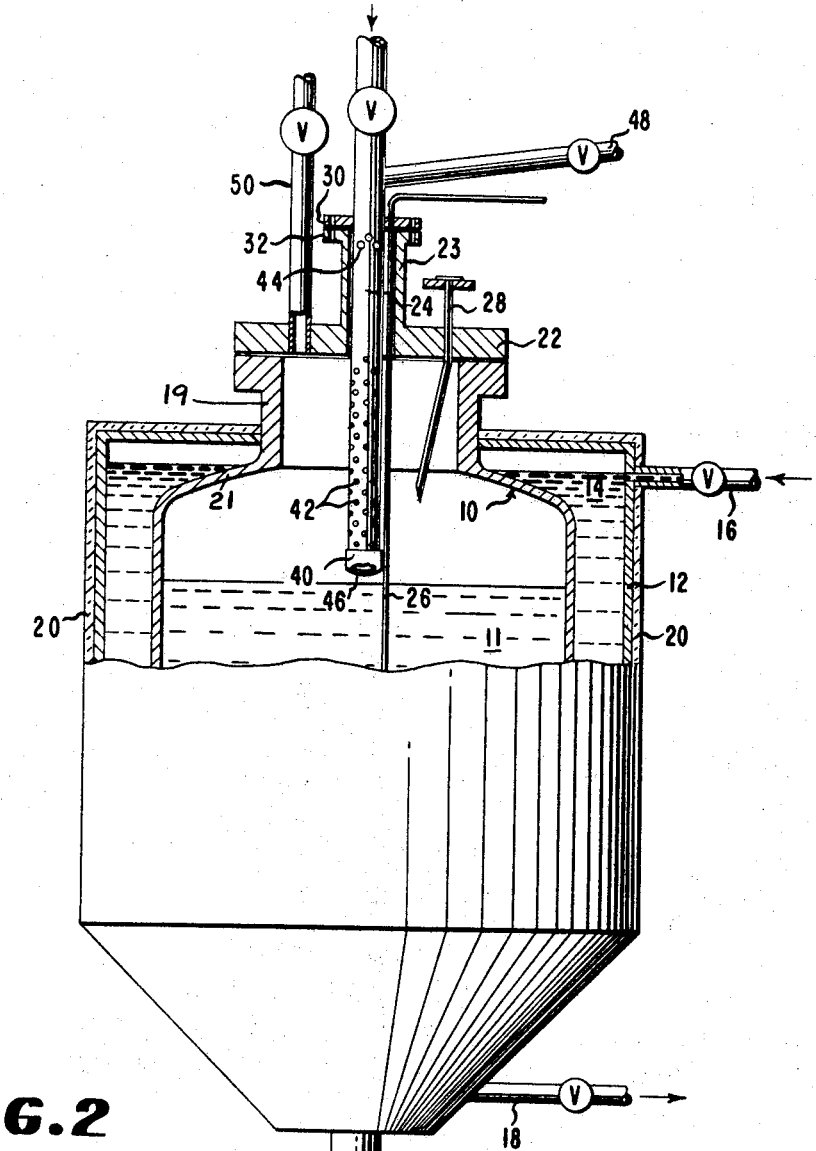
FIGURE 1 is a side, elevational view, partially sectioned, of a batch autoclave into which the improvements of the present invention have been incorporated.

The autoclave embodiment shown in FIG. 1 includes an inner vessel 10 and the outer shell 12 between which a heating fluid 14 is circulated. Fluid 14 is introduced through valved conduit 16 and exits through valved conduit 18. Outer shell 12 is suitably insulated as indicated at 20. The upper open end of the bottle-shaped vessel 10 is closed by a flanged fitting 22 through the neck 23 of which a fill conduit 24, a thermowell 26, and a delusterant nozzle 28 pass. The extent to which fill conduit 24 projects downwardly into vessel 10 is determined by the engagement of an integrally attached flange 30 with a cooperating flange 32 on neck 23. The autoclave is also provided with a valved outlet 34 terminating in an extrusion head 36 from which molten polymer issues as a ribbon 38.

Figure 2:
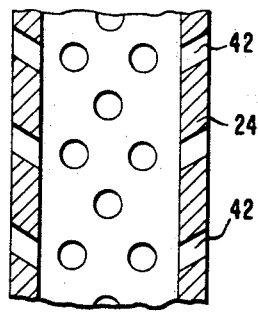
FIG. 2 is a fragmentary sectional view of the fill conduit shown in FIG. 1.

Fill conduit 24 extends downwardly into vessel 10 and terminates just above the illustrated normal level for salt solution 11. As best shown in FIG. 2, conduit 24 is a relatively thick walled pipe. It is closed at its lower end by a cap 40. Pipe 24 is provided with a plurality of discharge holes 42 in the length thereof which is opposite neck and shoulder portions 19, 21 of vessel 10. A few discharge holes 44 are situated just beneath flange 30, opposite neck 23. Cap 40 is provided with two downwardly directed discharge holes 46. As shown in FIG. 2, each hole 42, 44 is slanted upwardly at an angle of about 30° with a radius of pipe 24. In this manner, liquid reactants such as an aqueous diamine-dicarboxylic acid salt solution enter vessel 10 as a spray which is directed upwardly and outwardly toward neck and shoulder portions 19, 21, 23 in such a manner as to flush the residue of a preceding batch from the autoclave walls. Depending on the arrangement of such features as necks 19, 23, shoulder 21, delusterant nozzle 28 and thermowell 26 in a particluar autoclave installation, the angular disposition as well as the location of some of the discharge holes 42, 44 may be varied to insure that these surfaces and elements will be flushed either directly or by spattered reactants.

At an appropriate point in the polymerization process, steam is bled from the autoclave through a valved pipe 50 which also is mounted on and extends through fitting 22. Fill conduit 24 communicates with a valved pipe 48 through which a pressurized inert gas can be admitted to the autoclave.

Figure 3:
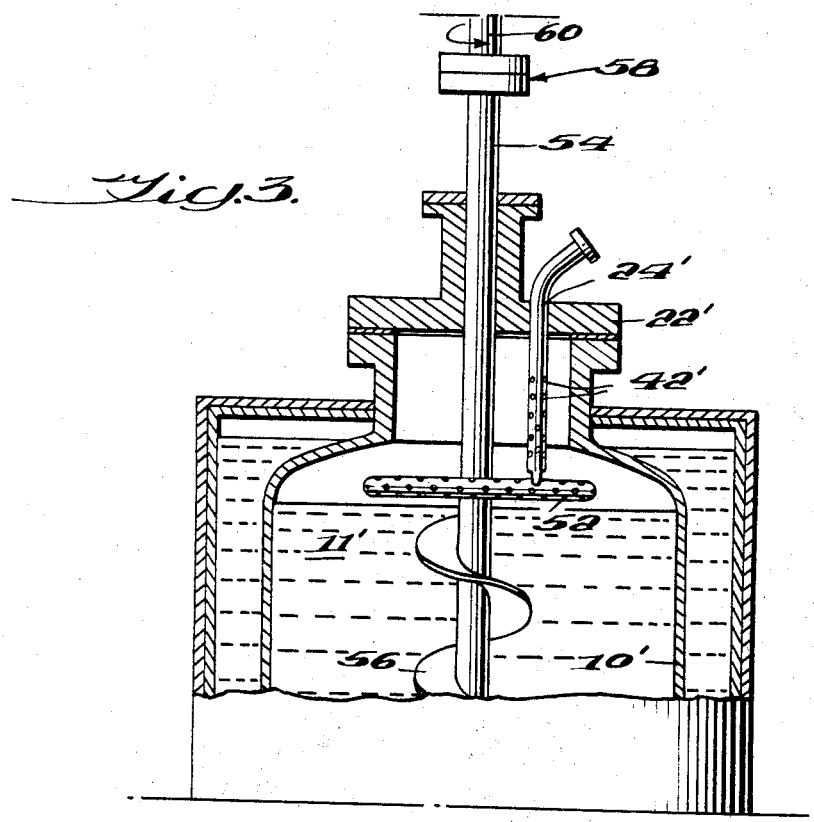
FIG. 3 is a fragmentary, front, elevational view of an otherwise identical autoclave equipped with a modified fill conduit and a stirrer.
Figure 4:
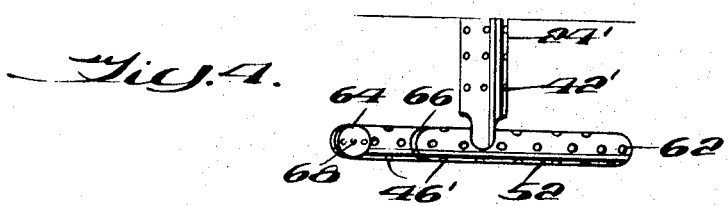
FIGS. 4 and 5 are side and plan views, respectively, of the modified fill conduit.
Figure 5:
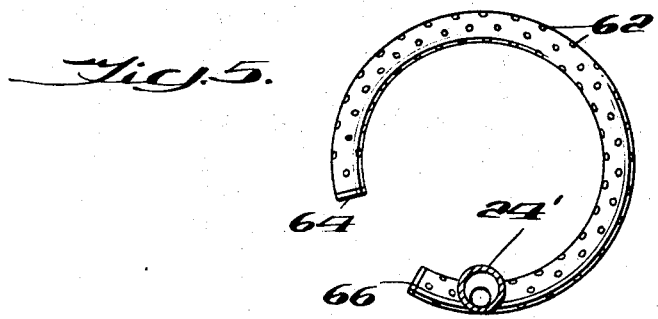

In the modification of FIGS. 3–5, a fill conduit 24' extends downwardly into vessel 10' and communicates with a supported circular conduit 52 which nearly surrounds an agitator shaft 54. The latter carries a stirring screw 56 and is driven through a coupling 58 from a drive shaft 60.

Conduit 24' is provided with a plurality of upwardly slanted discharge holes 42', whereas pipe 52 has a plurality of radially directed discharge holes 62 in its upper surface. In addition, there are downwardly directed discharge holes 46' in pipe 52. The latter encompasses an arc of about 240° and has its ends closed by caps 64, 66. As shown in FIG. 4, cap 64 has axially directed discharge holes 68.

In much the same manner as has been described in connection with FIG. 1, the aqueous diamine-dicarboxylic acid salt solution enters vessel 10' as a spray which flushes the residue of a preceding batch from the autoclave walls and from various elements such as agitator shaft 54, the delusterant nozzle and the thermocouple (see FIG. 1). The angular disposition, as well as the number and location of discharge holes 62, 68, 42', may be varied to insure that all surfaces and elements above the lowest level of reactants 11' will be flushed either directly or by spattered reactants.

The details of the over-all process as well as the improvements therein are set forth in the following exemplification of a typical run, wherein frequent reference is made to FIGS. 1 and 2.

EXAMPLE

A 48% aqueous solution of hexamethylene diammonium adipate (66 nylon salt) and 0.3 mol percent (based on salt of a 25% aqueous acetate acid solution viscosity stabilizer) are charged to an evaporator and concentrated to 60% at atmospheric pressure, which corresponds to a final temperature of about 105° C. The 60% salt solution is transferred to a stainless steel autoclave of the type illustrated in FIG. 1, the salt solution being charged to vessel 10 through fill conduit 24. The solution is then heated under autogenous conditions until the pressure reaches 250 p.s.i. The salt solution is heated by means of heat transfer fluid 14 which enters through conduit 16 and exits through conduit 18. When the pressure reaches 250 p.s.i., steam is gradually bled off through pipe 50; 250 p.s.i. pressure is maintained and the heating is continued until the concentration of salt is about 90% (temperature approximately 230° C.). At this point, various additives may be added, as at 28. Heating and bleeding of steam at 250 p.s.i. pressure are continued until the temperature reaches 245° C. whereupon the pressure is gradually reduced by accelerating the steam bleed-off for a period of about 90 minutes, until the temperature has reached 270° C. and the pressure has been reduced to atmospheric. Heating at atmospheric pressure is continued until 275° C. is reached to complete the polymerization. The autoclave is brought to 100 p.s.i. by the introduction of an oxygen-free gas (e.g., nitrogen) through pipe 48 and molten polymer is discharged as a ribbon 38 by extrusion through a narrow slit in head 36. The ribbon is quenched by well-known means such as on a water-cooled casting wheel.

Prior to adoption of the disclosed improvements, an autoclave overhaul was required after about 800 polymer batches because of excessive gel build-up, particularly above the melt pool level. Modification of the salt fill line to a spray nozzle which cleans the head, neck and shoulder portions at each salt charge has permitted extension of the overhaul cycle to about 5500 polymer batches. The overhaul is made at this point not because of the gel formation but because of other requirements such as a safety inspection to check the autoclave for metal fatigue.

Although the specification and the example have been directed primarily to the polymerization of nylon salt solutions in a batch autoclave, it is apparent that the disclosed process and apparatus improvements are applicable to any equivalent batch procedure wherein a residue is formed on the inner walls of a container. It is also apparent that the omission of a separate flushing step may be accomplished with variations of the illustrated apparatus without departing from the spirit of the present invention which is accordingly intended to be limited only by the scope of the appended claims.

Having thus described the invention, what is claimed as new and desired to be secured by Letters Patent is:

1. In a polymerization process including the steps of heating a batch of aqueous diamine-dicarboxylic acid salt solution in an autoclave under amidation temperature and pressure conditions, bleeding steam generated in the amidation reaction and discharging molten polycarbonamide from the autoclave, the improvement which comprises charging said autoclave by spraying said salt solution against its inner walls above the normal solution level, thereby flushing the residue of a preceding batch from said walls as a new batch accumulates.

2. In a polymerization process including the steps of heating a batch of an aqueous diamine-dicarboxylic acid salt solution in an autoclave under amidation temperature and pressure conditions and discharging molten polycarbonamide from the autoclave, the improvement which comprises charging said autoclave by spraying said salt solution against its inner walls above the normal solution level, thereby flushing the residue of a preceding batch from said walls and into the accumulating batch.

3. In a process including the steps of heating a batch of aqueous carbonamide-forming reactants of the type which leave a residue in an autoclave having a discharge outlet and pressurizing the autoclave to discharge the reaction product, the improvement which comprises charging said autoclave by spraying said reactants both downwardly into the autoclave and outwardly against its inner walls above the normal reactants level, thereby flushing the residue of a preceding batch from said walls as a new batch accumulates.

References Cited

UNITED STATES PATENTS

| | | | |
|---|---|---|---|
| 2,908,666 | 10/1959 | Notarbartolo | 260—78 |
| 3,027,355 | 3/1962 | Taul et al. | 260/78 |
| 2,357,187 | 8/1944 | Hagedorn | 260—78 |
| 2,367,469 | 1/1945 | Moller | 260—78 |
| 2,165,935 | 7/1939 | Manzel | 23—290 |
| 2,356,628 | 8/1944 | Stalman | 23—290 |
| 2,278,878 | 4/1942 | Hoff | 260—78 |
| 2,440,730 | 5/1948 | Stamatoff | 23—285 XR |
| 2,726,180 | 12/1955 | Stankey | 134—22 |

WILLIAM H. SHORT, *Primary Examiner.*

H. D. ANDERSON, *Assistant Examiner.*